United States Patent
Vergis

(10) Patent No.: US 11,961,391 B2
(45) Date of Patent: *Apr. 16, 2024

(54) CODESET COMMUNICATION FORMAT AND RELATED METHODS AND STRUCTURES

(71) Applicant: Universal Electronics Inc., Scottsdale, AZ (US)

(72) Inventor: George Vergis, Fremont, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,887

(22) Filed: Apr. 18, 2023

(65) Prior Publication Data

US 2023/0252886 A1  Aug. 10, 2023

Related U.S. Application Data

(63) Continuation of application No. 17/839,097, filed on Jun. 13, 2022, now Pat. No. 11,657,703, which is a continuation of application No. 16/595,684, filed on Oct. 8, 2019, which is a continuation of application No. 16/248,941, filed on Jan. 16, 2019, now Pat. No. 10,490,064, which is a continuation of application No. 15/380,130, filed on Dec. 15, 2016, now Pat. No. 10,192,428, which is a continuation of application No. 14/276,466, filed on May 13, 2014, now Pat. No. 9,582,996, which is a continuation of application No. 12/706,080, filed on Feb. 16, 2010, now Pat. No. 8,761,199, which is a continuation of application No.

(Continued)

(51) Int. Cl.
G08C 23/04 (2006.01)
G08C 19/28 (2006.01)
H04N 21/422 (2011.01)

(52) U.S. Cl.
CPC ............. *G08C 23/04* (2013.01); *G08C 19/28* (2013.01); *H04N 21/42204* (2013.01); *H04N 21/42221* (2013.01)

(58) Field of Classification Search
CPC .................... G08C 23/04; G08C 19/28; H04N 21/42204; H04N 21/42221
See application file for complete search history.

(56) References Cited

U.S. PATENT DOCUMENTS

| | | | |
|---|---|---|---|
| 5,515,052 A * | 5/1996 | Darbee | H03J 1/0025 398/1 |
| 6,104,334 A | 8/2000 | Allport | |
| 6,131,082 A | 10/2000 | Hargrave et al. | |

(Continued)

*Primary Examiner* — Amine Benlagsir
(74) *Attorney, Agent, or Firm* — Greenberg Traurig, LLP

(57) ABSTRACT

A codeset is described in a Public Codeset Communication Format (PCCF) as a format block including a plurality of fields having readily decipherable values, such as ASCII character values. One field is a mark/space information field that includes a sequence of mark time indicators and space time indicators for an operational signal of the codeset. A second field is a signal characteristic information field for the operational signal. Signal characteristic information may include carrier on/off information, repeat frame information, toggle control information, and last frame information. The PCCF is a codeset interchange format of general applicability.

7 Claims, 4 Drawing Sheets

Related U.S. Application Data

11/359,149, filed on Feb. 21, 2006, now Pat. No. 7,668,197.

(56) References Cited

U.S. PATENT DOCUMENTS

| | | | |
|---|---|---|---|
| 6,408,435 B1 | 6/2002 | Sato | |
| 6,411,699 B1 | 6/2002 | Fleischer et al. | |
| 6,947,101 B2 * | 9/2005 | Arling | H04N 21/47 348/E5.103 |
| 7,116,229 B1 | 10/2006 | Miramontes | |
| 7,227,492 B1 * | 6/2007 | Provis | G06F 9/45508 341/176 |
| 7,259,696 B1 * | 8/2007 | Lee | G06F 9/45533 341/23 |
| 7,668,197 B1 * | 2/2010 | Vergis | G08C 23/04 370/464 |
| 7,783,205 B1 * | 8/2010 | Chaney | H04B 10/1141 330/59 |
| 7,831,930 B2 * | 11/2010 | Dresti | H04N 7/16 715/714 |
| 7,855,672 B1 * | 12/2010 | Provis | H04L 69/28 711/155 |
| 7,895,301 B1 | 2/2011 | Mui et al. | |
| 8,761,199 B2 | 6/2014 | Vergis | |
| 2001/0033243 A1 | 10/2001 | Harris et al. | |
| 2004/0111745 A1 | 6/2004 | Schein et al. | |
| 2004/0117632 A1 * | 6/2004 | Arling | H04L 9/0891 713/182 |
| 2004/0127177 A1 * | 7/2004 | Kamitani | G08C 23/04 455/130 |
| 2004/0189508 A1 * | 9/2004 | Nguyen | G08C 17/02 341/176 |
| 2005/0007616 A1 | 1/2005 | Sugiyama et al. | |
| 2005/0027888 A1 * | 2/2005 | Juszkiewicz | G10H 1/0058 709/250 |
| 2006/0087445 A1 | 4/2006 | Green | |
| 2007/0277036 A1 * | 11/2007 | Chamberlain | G06F 9/4881 713/171 |

* cited by examiner

US 11,961,391 B2

CODESET COMMUNICATION FORMAT AND RELATED METHODS AND STRUCTURES

RELATED APPLICATION

This application claims the benefit of and is a continuation of U.S. application Ser. No. 17/839,097, filed on Jun. 13, 2022, which application claims the benefit of and is a continuation of U.S. application Ser. No. 16/595,684, filed on Oct. 8, 2019, which application claims the benefit of and is a continuation of U.S. application Ser. No. 16/248,941, filed on Jan. 16, 2019, which application claims the benefit of and is a continuation of U.S. application Ser. No. 15/380,130, filed on Dec. 15, 2016, which application claims the benefit of and is a continuation of U.S. application Ser. No. 14/276,466, filed on May 13, 2014, which application claims the benefit of and is a continuation of U.S. application Ser. No. 12/706,080, filed on Feb. 16, 2010, which application claims the benefit of and is a continuation of U.S. application Ser. No. 11/359,149, filed on Feb. 21, 2006. These applications are incorporated herein by reference in their entirety.

TECHNICAL FIELD

The present invention relates generally to codesets that are used by remote control devices to generate operational signals that control electronic consumer devices.

BACKGROUND

Manufacturers of electronic consumer devices, such as televisions, radio tuners, digital video disk players, video cassette recorders, set-top cable television boxes, set-top satellite boxes, etc., typically supply a remote control device along with each electronic consumer device. The remote control device can control the associated electronic consumer device by sending an operational signal to the electronic consumer device. The operational signal may, for example, be the envelope of an infrared signal. The operational signal carries a key code. Each such key code corresponds to a function of the selected electronic consumer device, such as power on, volume down, play, stop, select, channel advance, channel back, etc. Thus, an electronic device is controlled by a codeset of key codes.

Codesets can differ from each other not only by the different key codes, but also by the carrier, timing and framing protocols used to output the key codes as operational signals. In order to avoid the situation where an operational signal containing a key code operates an electronic device that is not selected, manufacturers of electronic consumer devices may use different codesets for different devices. Although each model of electronic consumer device might not have a unique codeset, there are nevertheless thousands of codesets used to operate the various types, brands and models of electronic consumer devices sold in the world market today.

Handheld remote control devices typically include an amount of storage, a processor, and a transmitting device. Where the remote control device is a handheld infrared remote control device, the storage is typically semiconductor memory that is on the same microcontroller integrated circuit as the processor. The transmitting device may, for example, be an infrared light emitting diode (LED). Information on one or more codesets is stored in the memory of the microcontroller. When a key is pressed on the remote control device, the microcontroller accesses the codeset information and generates an appropriate key code signal. The key code signal is modulated with the appropriate carrier and is supplied to the LED, thereby causing the operational signal to be transmitted as an envelope of the infrared signal.

Such microcontrollers are typically supplied to remote control manufacturers preloaded with codesets that operate the various types, brands and models of electronic devices that the remote control device is to operate. It is therefore of significant value to such a microcontroller manufacturer to be able to supply the appropriate codesets needed for each possible remote control application. A microcontroller manufacturer that has the codeset needed for a particular remote control application has a competitive advantage over another microcontroller manufacturer that does not have the needed codeset. Some microcontroller manufacturers therefore devote great effort and expense amassing large and comprehensive databases of codesets. These codeset databases are valuable to the microcontroller manufacturers.

Such microcontroller manufacturers have therefore conventionally attempted to keep their codeset databases proprietary. When working with a remote control device designer/manufacturer, the microcontroller manufacturer is careful not to disclose the format of the codeset information stored in the microcontroller. The codeset information may only be provided to the remote control manufacturer in the form of information stored in a mask-programmable read only memory (ROM) on the microcontroller integrated circuits. Reading this codeset information out of the microcontroller may be difficult, thereby helping to keep the information confidential. Even if a remote control device manufacturer were to be able to read the codeset information out of the microcontroller memory, the remote control device manufacturer would not know the format of the codeset information. Because a rendering engine in the microcontroller receives information in a particular format and converts that information into the operational signals, and because how the rendering engine does this conversion is not known to the remote control device manufacturer, the remote control manufacturer's knowledge of the codeset information stored in the microcontroller does not allow the remote control manufacturer to use the codeset information in a microcontroller from another microcontroller manufacturer. By concealing how the rendering engine works and the format of information that the rendering engine receives as inputs, the deciphering of the codeset information stored on the microcontroller is prevented. Conventionally, considerable care is exercised keeping the format of codeset information as supplied to the rendering engine as much of a secret as is reasonably possible. Conventionally, the microcontroller manufacturer does not share the format of the codeset information with any other entity, even its best remote control device manufacturing customers.

SUMMARY

A codeset is described in a Public Codeset Communication Format (PCCF) as a format block. The PCCF format block includes a plurality of readily decipherable fields of ASCII character values. Where the various fields are in the block and what the various fields contain is made public as part of the PCCF. One field of the PCCF format block is a mark/space information field that includes a sequence of mark time indicators and space time indicators for an operational signal of the codeset. A second field is a signal characteristic information field for the operational signal. Signal characteristic information may include carrier on/off information, repeat frame information, toggle control information, and last frame information. The PCCF is a codeset interchange format of general applicability. The PCCF may, for example, be made public by posting it on a publicly available web-site.

In one method, a first entity (for example, a remote control device designer) describes a codeset in the PCCF format and then communicates the PCCF format information to a second entity (for example, a microcontroller manufacturer). The communication can be by any suitable mechanism, but is preferably communication of an ASCII file by reliable electronic means. The second entity converts the information into a format usable by a rendering engine. The rendering engine may, for example, be a part of a microcontroller supplied and/or manufactured by the second entity. The rendering engine is then usable in the remote control device to generate operational signals of the codeset.

Where the rendering engine is part of a microcontroller supplied by the second entity, the second entity may preload the information in the format usable by the rendering engine into memory in the microcontroller. The second entity then supplies the microcontroller preloaded with the codeset information to the first entity so that the first entity can incorporate the microcontroller into the remote control device being designed. The remote control device can then use the preloaded information to generate operational signals in the codeset.

A valuable database of codesets compiled by the second entity (the microcontroller manufacturer) can also be preloaded into the microcontroller. Codesets in the database are described in the same PCCF format as PCCF format blocks. The PCCF format blocks are compressed and reformatted by the second entity into the format that is usable by the rendering engine of the microcontroller. The compressed and reformatted information is then encrypted by the second entity and is preloaded into the microcontroller along with the unencrypted codeset information described above. The microcontroller is then supplied to the first entity and is incorporated into the remote control device being designed. The encrypted form of the codeset information in the microcontroller helps maintain the proprietary nature of the codeset database information.

When a key is pressed on the remote control device such that an operational signal in one of the codesets of the database is to be generated, the encrypted information is retrieved from microcontroller memory, is decrypted by the decryptor within the microcontroller, and is supplied in unencrypted form to the rendering engine. The rendering engine uses the unencrypted information to generate the desired operational signal for the desired codeset in the database. In this way, a microcontroller can include both encrypted codeset information from a codeset database compiled by the second entity (the microcontroller manufacturer) as well as unencrypted codeset information that was originally written by the first entity (the remote control device designer) in the PCCF format.

The PCCF format is a codeset interchange format of general applicability and can be used to describe and communicate codeset information between various different types of entities. The interchange is not limited to the interchanges described microcontroller manufacturers/suppliers and remote control device designers/manufacturers. Accordingly, other embodiments involving other uses of PCCF format blocks are described in the detailed description below.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
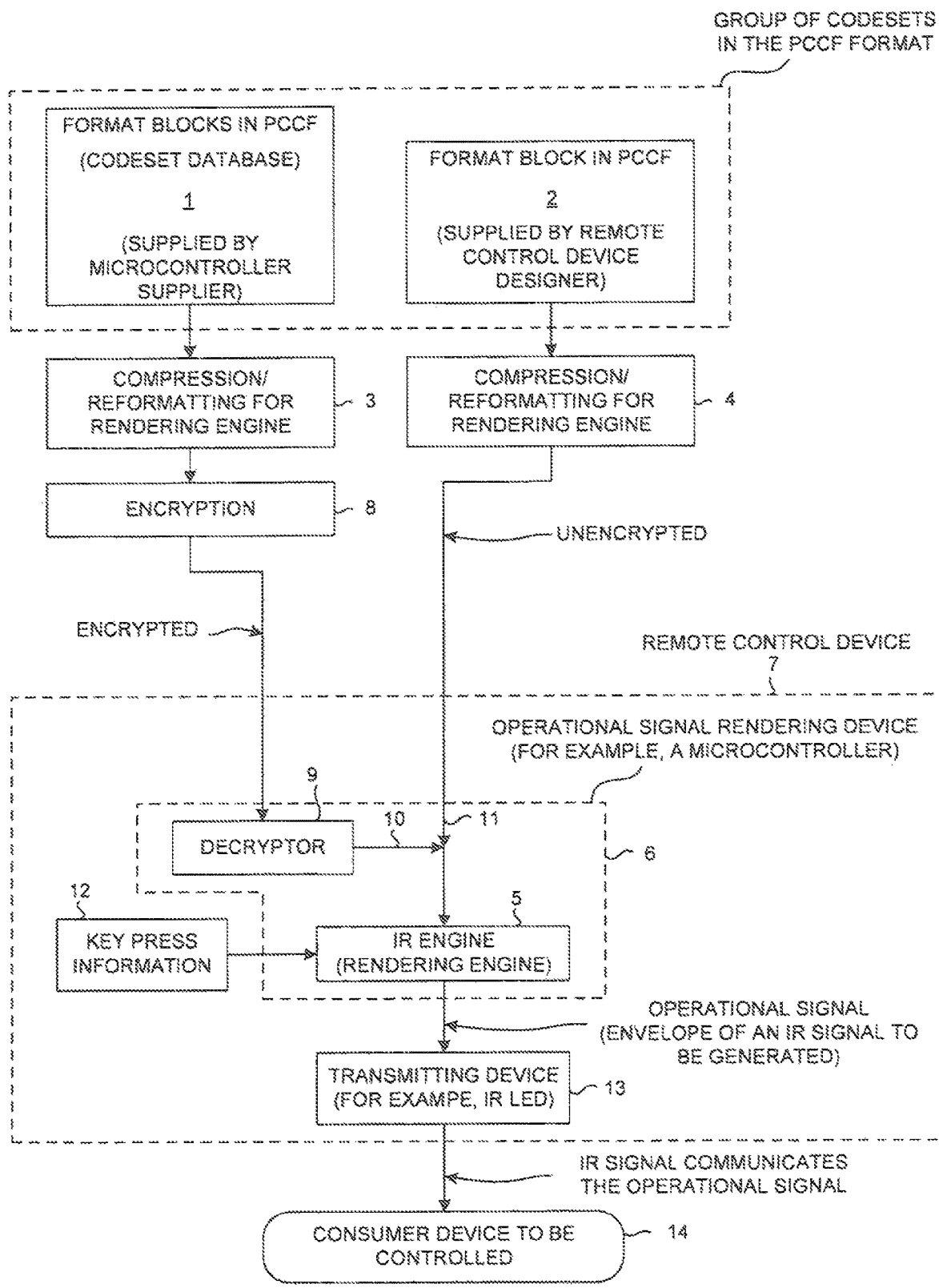
FIG. 1 is a simplified diagram that illustrates a novel method involving a PCCF format block.

Rather than maintaining the format of information in a codeset database proprietary, a novel Public Codeset Communication Format (PCCF) is disclosed. A first entity (for example, a company that supplies and/or makes microcontrollers and that has also compiled a codeset database) describes the codesets in its database in accordance with the PCCF format. (The term database is used here in a general non-technical sense and refers to a group of codesets and possibly related information, where the codesets are stored in association with one another.) A second entity (for example, a remote control device manufacturer) can also describe codesets in the PCCF format.

A particular codeset is describable in the PCCF format as a readily decipherable format block of ASCII (American Standard Code for Information Interchange) character values. The format block has multiple fields. One of the fields is a mark/space information field that specifies mark times and space times for generating the operational signal. Another of the fields is a signal characteristic information field that specifies other information about how to render the operational signal. The signal characteristic information field may include information such as: carrier information, information on how to repeat the operational signal, toggle control information, and last frame information. The PCCF format block may also contain other fields including a key layout table. The key layout table sets forth the physical location of keys on the remote control device to which the codeset being described pertains. The key layout table may also set forth text that appears printed on the remote control device. The PCCF format block may also contain other fields including a key function identification table. The key function identification table indicates how a device that receives a particular operational signal will respond to receiving the operational signal. The layout of the various fields in the format block as well as the meaning of information in each field is made public. The information content of the various fields is easily decipherable because the PCCF format block is a block of ASCII character values.

In one novel method, a first entity (for example, a microcontroller supplier and/or manufacturer that has compiled a valuable database of codesets) wishes to receive royalty income for the licensing of the codeset database to a second entity (for example, a manufacturer or designer of a new remote control device). The microcontroller supplier supplies the remote control device manufacturer with: 1) an encrypted version of the codeset database, and 2) a microcontroller that includes a rendering engine, a decryptor, and a memory. If the rendering engine receives codeset information in a particular format, then the rendering engine can generate operational signals in the codeset. The format of the codeset information received by the rendering engine is proprietary to the microcontroller supplier.

All the codesets in the codeset database are described in accordance with the PCCF format. The information in the resulting PCCF format blocks is then compressed and reformatted as necessary to put the information into a form required by the rendering engine on the microcontroller. The compressed and reformatted information is then encrypted and stored in encrypted form in the memory in the microcontroller. The memory may, for example, be mask programmable read-only-memory (ROM) such that the storing actually occurs at the time of microcontroller integrated circuit manufacture.

After microcontroller manufacture, the microcontroller can be incorporated into the new remote control device. If a key were pressed on the new remote control device such that an operational signal from one of the codesets in the data were to be generated by the remote control device, then the appropriate encrypted information in memory would be retrieved, would be decrypted by the decryptor on the microcontroller, and would be supplied to the rendering engine. The rendering engine would output an appropriate operational signal that would drive a transmitting device (for example, an infrared light emitting diode) on the remote control device. The resulting infrared signal would be transmitted from the remote control device and would carry the operational signal to the consumer device to be controlled. If, for example, the operational signal is the operational signal for the power on command in the proper codeset understood by the receiving electronic consumer device, then the electronic consumer device powers on as desired.

In the present example, the remote control device manufacturer (the second entity) wants the new remote control device to be able to generate operational signals in a special codeset that is not present in the codeset database of the microcontroller manufacturer. The remote control device manufacturer, however, is aware of the Public Codeset Communication Format (PCCF). The remote control device manufacturer describes the special codeset in accordance with the PCCF. The resulting PCCF format block is then communicated from the remote control device manufacturer (the second entity) to the microcontroller supplier (the first entity). The microcontroller supplier compresses and reformats the information in the PCCF format block as required to put the information into a form that can be understood by the rendering engine on the microcontroller. If the rendering engine on the microcontroller were to receive the compressed and reformatted information, then the rendering engine would be able to generate operational signals in the special codeset. Accordingly, the microcontroller supplier (the first entity) stores in microcontroller memory both the compressed and reformatted PCCF information for the special codeset as well as the compressed, reformatted and encrypted information from the microcontroller supplier's codeset database. As a result, when the microcontroller is used in the new remote control device, the new remote control device will be able to generate operational signals in the special codeset and well as operational signals in any codeset in the database.

Because the microcontroller is designed to make the intercepting of information between the output of the decryptor and the rendering engine difficult, the remote control device manufacturer will not be able to readily decipher the content of the unencrypted codeset database information as it passes from the output of the decryptor to the rendering engine. The proprietary content of the codeset database is therefore not compromised. Due to the encryption, the codeset database information as supplied by the microcontroller manufacturer is only usable on microcontrollers supplied by the microcontroller supplier (the first entity) that have the proper decryptor. The supplier's income stream from the sale of microcontrollers and from the licensing of the codeset database is therefore protected. The description of codesets in the same PCCF format regardless of whether the descriptions were generated by the microcontroller supplier (the first entity) or were generated by the remote control device manufacturer (the second entity) simplifies the compressing and formatting operations that the microcontroller supplier has to do to put the PCCF format blocks generated by the second entity in a proper form for being used by the rendering engine.

FIG. 1 is a simplified diagram that corresponds to the novel method set forth above. Block 1 represents the database of codesets that were compiled by the microcontroller supplier (the first entity). The codesets are described in the PCCF format as a plurality of PCCF format blocks.

Block 2 represents the PCCF format block that describes the special codeset. The PCCF format block was generated by the remote control device manufacturer or designer (the second entity).

Blocks 3 and 4 represent the compression and reformatting performed by the microcontroller manufacturer to convert the PCCF format blocks into a format that can be received and used by the rendering engine of the microcontroller. The rendering engine is represented by block 5. Dashed block 6 represents an operational signal rendering device such as, for example, a microcontroller.

Block 7 represents the new remote control device that is being designed and/or manufactured by the remote control device manufacturer (the second entity). The remote control device 7 can be a handheld infrared remote control device of the form typically used to control electronic consumer devices such as televisions in the home. The remote control device 7 can alternatively be another type of remote control device such as a personal computer that has a television tuner expansion card installed. Codeset information is stored in the personal computer in mass storage on hard disc or elsewhere. A processor (for example, a microcontroller supplied by the first entity) on the expansion card uses this information to generate operational signals. The operational signals are supplied to a transmitter (for example, an IR LED) that is coupled to the expansion card. A signal (for example, an infrared signal) that carries an operational signal is transmitted from the transmitter and to an electronic consumer device so that the personal computer can control the electronic consumer device. The handheld remote control device and the personal computer having the expansion card are but two examples of remote control devices. The remote control device 7 can take other forms as well.

As described above, the compressed and reformatted codeset information from block 3 is encrypted before it is loaded into the operational signal rendering device 6. Block 8 represents this encryption. The encryption is performed by the microcontroller supplier. The operational signal rendering device (in this case, a microcontroller) includes a decryptor 9 for decrypting the information encrypted by block 8. The output of the decryptor 9 is in the compressed and reformatted form required by the rendering device 5. Accordingly, the rendering engine 5 of FIG. 1 can receive properly compressed and formatted codeset information from the first entity's codeset database or from the second entity's special codeset. The supplying of these two sources of compressed and properly formatted information are represented by arrows 10 and 11.

The operational signal rendering device 6, in response to receiving key press information, uses codeset information received via source 10 or source 11 to generate an operational signal in an appropriate codeset. Where the remote control device is a handheld remote control device of a typical form, the microcontroller has key scanning functionality that detects when a key is pressed and reports which key it was that was pressed. Block 12 represents this key press information that causes the rendering engine to output an operational signal.

Block 13 represents the transmitting device that communicates the operational signal. In the present example, the transmitting device is an infrared LED. Block 14 represents the electronic consumer device that receives the infrared signal and responds to the operational signal.

Figure 2:
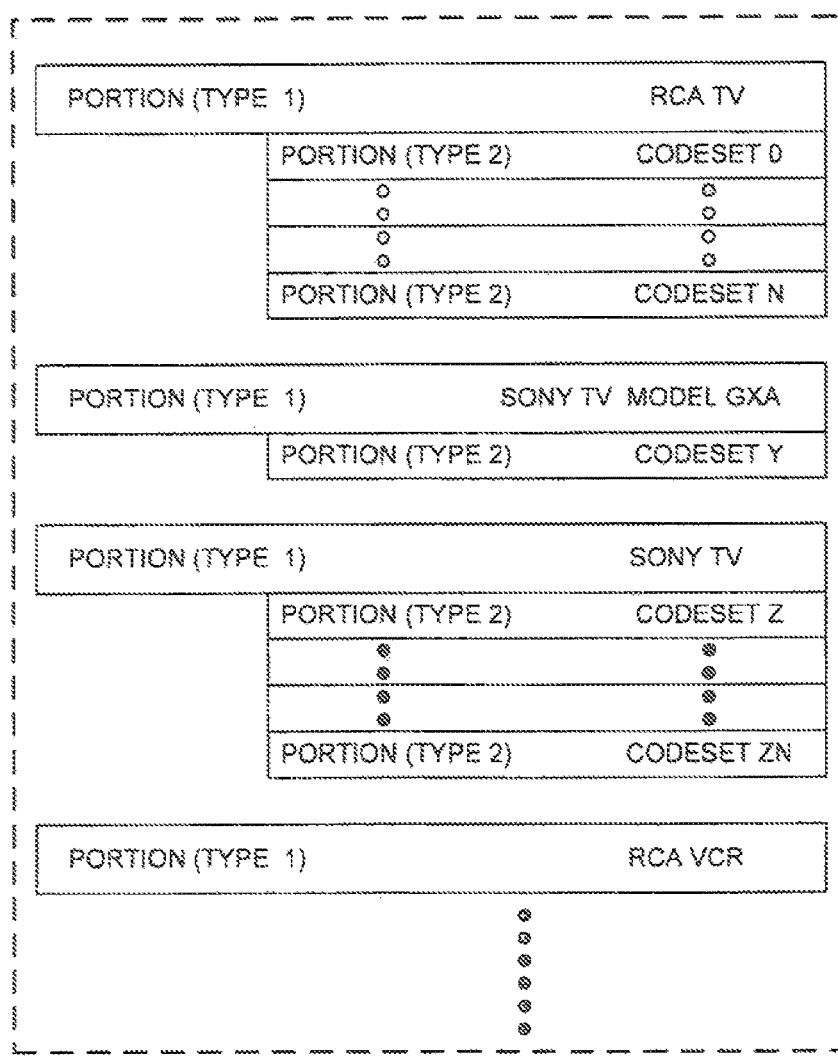
FIG. 2 is a simplified diagram of multiple codesets described in PCCF format blocks.

FIG. 2 is a simplified diagram that shows the PCCF format block 2 generated by the remote control device manufacturer (the second entity) as well as the PCCF format blocks 1 of the codeset database of the microcontroller supplier (the first entity). The PCCF format block 2 for the special codeset includes a first portion 15 of type 1 as well as a second portion 16 of type 2.

Figure 3:
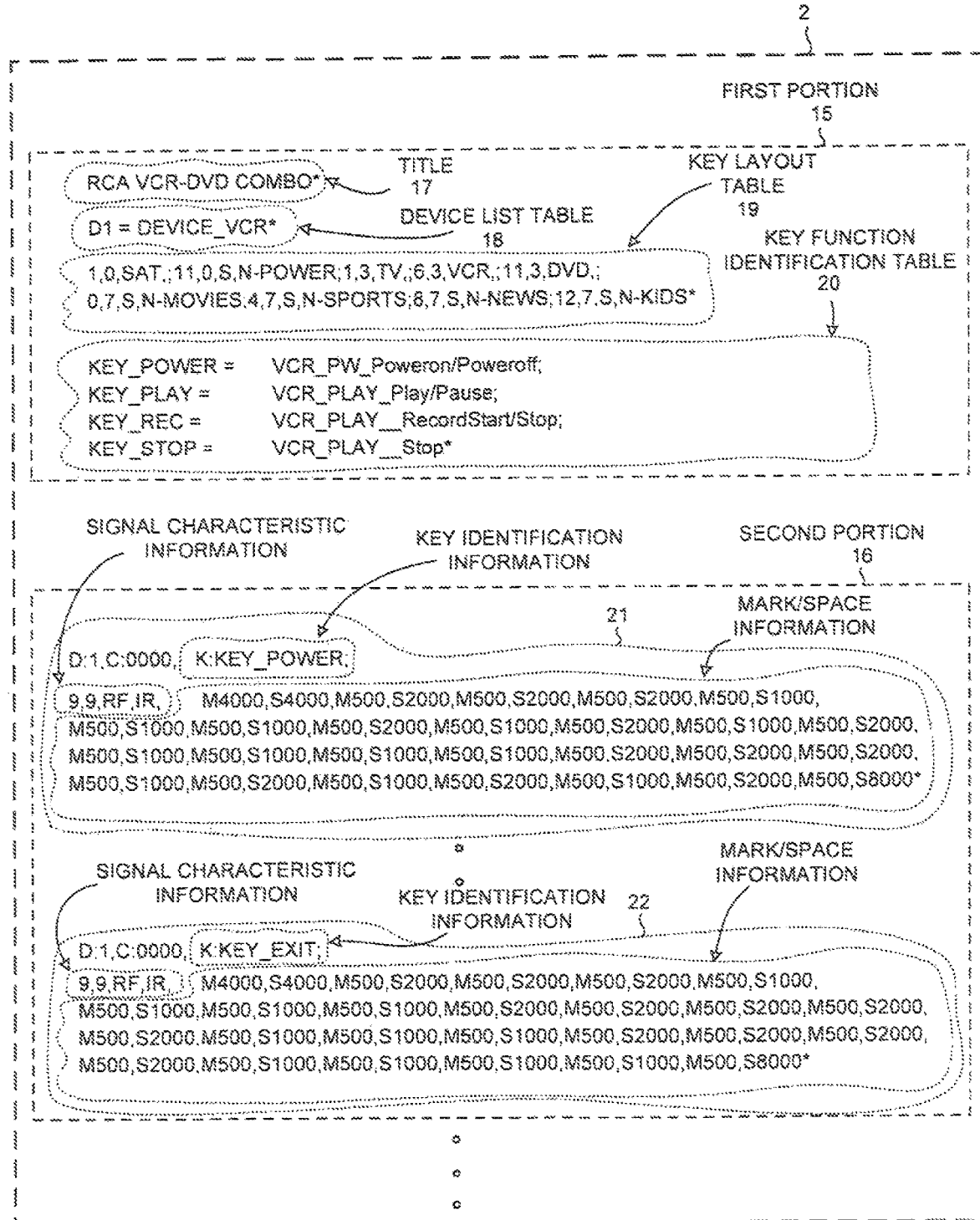
FIG. 3 is a more detailed diagram of one PCCF format block.

FIG. 3 is a more detailed diagram of the PCCF format block 2 of FIG. 2. First portion 15 includes general information that pertains to all operational signals of the codeset. In first portion 15, the first asterisk-delimited ASCII field 17 is a title field that contains the value "RCA VCR-DVD COMBO". This value indicates the type of device to be controlled by the codeset. There may be multiple different codesets that control the device. For example, a first codeset may be used to control the RCA VCR-DVD COMBO device when the device is operating as a VCR whereas a second codeset may be used to control the device when the device is operating as a DVD. In the present example, there is only one codeset that is used to control the RCA VCR-DVD COMBO device, regardless of whether the device is operating as a VCR or a DVD.

The second asterisk-delimited ASCII field 18 is a field that contains the value "D1=DEVICE_VCR". There may be multiple different models of the "RCA VCR-DVD COMBO" device type. Each such different model would be designated with a different device number. The "D1" in the example of FIG. 3 denotes the first such device. The value "DEVICE_VCR" is an indicator of the first device. In the example of FIG. 3, there is only one device of the type "RCA VCR-DVD COMBO".

Figure 4:
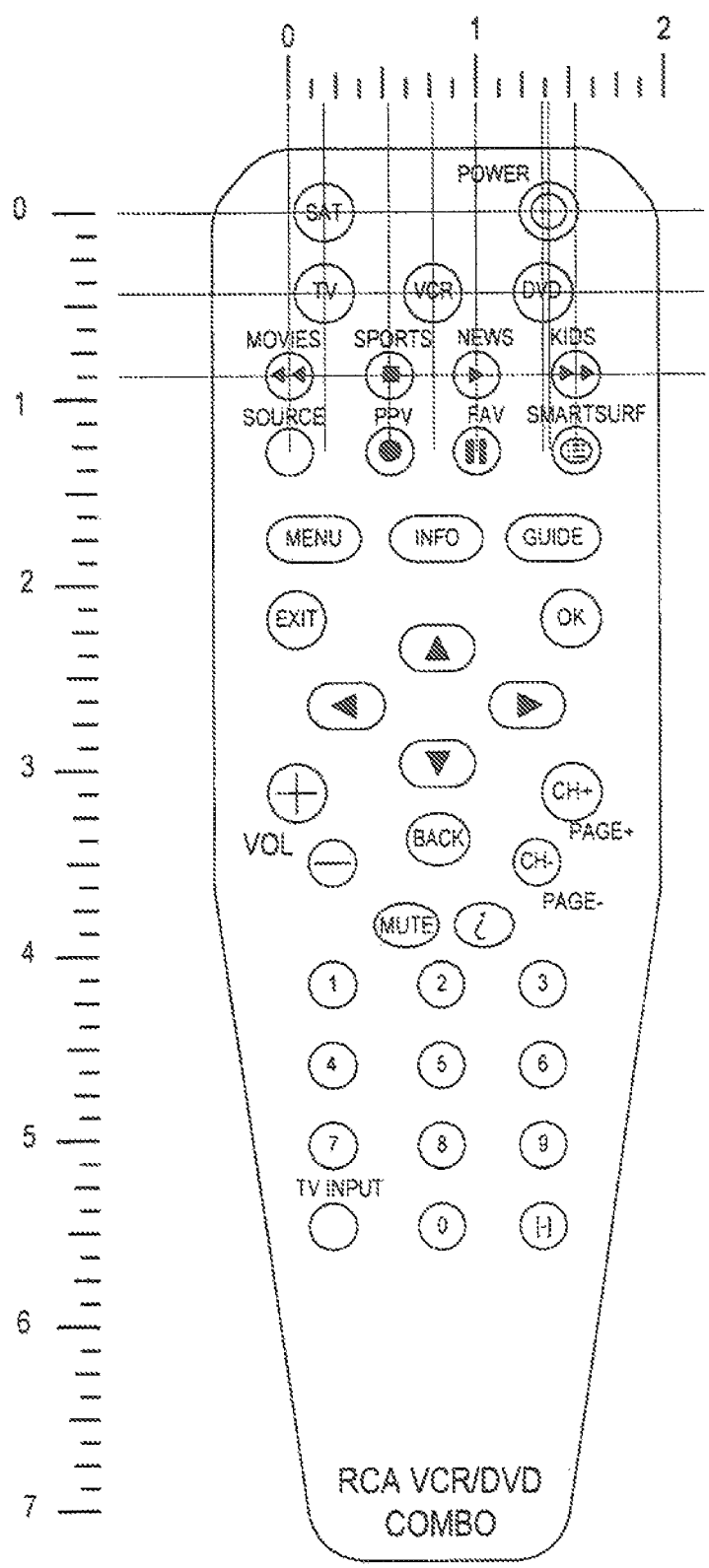
FIG. 4 is a diagram of a remote control device showing the X-Y coordinate grid that is used to describe the location of keys and text in the key layout table of a PCCF format block.

The third asterisk-delimited ASCII field 19 is a field 19 called the "key layout table". The key layout table includes a set of semicolon-delimited subfields. The first subfield is "1,0,SAT,;." This subfield includes a set of comma separated subsubfields. The "1" in the first subsubfield denotes the X coordinate location of a key on the remote control device. The "0" in the second subsubfield denotes the Y coordinate location of the key. FIG. 4 is a diagram of the remote control device. The key referred to is the key bearing the text "SAT". It is located at X-Y location "1,0". The next subsubfield contains the value "SAT". This value is the text that appears on the key. The last subsubfield is blank. This subsubfield could contain a value where the value is text that is printed on the remote control device body in association with the key. The value being blank indicates that there is no text printed on the remote control device body that corresponds to the key.

The second semicolon-delimited subfield is "11,0,S,S-POWER." The "11,0" denotes the X-Y location of the next key. The next "S" indicates that a symbol is printed on the key (rather than text). The next "N-POWER" denotes that the text "POWER" is printed on the body of the remote at location to the "north" (above) the key. If the text had appeared below the key, then the subsubfield would have the value "S-POWER", where the "S-" denotes "south". In the same way, other possible prefixes for the value include "E-" and "W-" for "east" and "west".

The fourth asterisk-delimited ASCII field is a field 20 called the "key function identification table". The key function identification table includes a set of semicolon delimited subfields. The first subfield is "KEY_POWER=VCR_PW_Poweron/Poweroff". The subfield indicates that the "KEY_POWER" function has the value "VCR_PW_Poweron/Poweroff." This value indicates that on each subsequent press of the power key, the VCR power is turned on, then off, then on, as so forth. The "KEY_POWER" function could alternatively have been assigned the value "VCR_PW_Poweron". This value would have meant that pressing the power key would turn the VCR power on. If the VCR power had already been on at the time of the key press, then the VCR power would have remained on.

The second semicolon-delimited subfield is "KEY_PLAY=VCR_PLAY_Play/Pause". The "VCR_PLAY_Play/Pause" value means that successive pressings of the "PLAY" key cause the VCR to play, to pause, to play, to pause, and so forth. The "KEY_PLAY" function could alternatively have been assigned the value "VCR_PLAY_Play". This value would mean that pressing the play key would cause the VCR to play. If the VCR was already playing, then the VCR would continue playing.

The third and fourth semicolon-delimited subfields are interpreted in a similar manner. Functions of the form "KEY_XXX" denote what function or functions is or are to be performed when the key "XXX" is pressed. A series of functions can be specified to be performed in association with a single key. In one example, the value assigned indicates a function and also indicates that the function is only to be performed if another key is pressed. For example, pressing the "SOURCE" key may change the designated source of input for the receiving device from one source to another, but the actual change of the source will only take place if the "OK" key is pressed next. This is sometimes called an "activate" feature. The activate feature may be indicated by following the first function value with "-A(OK)". This attribute indicates that the prior function is activated by pressing the "OK" key.

In the example of FIG. 3, there are only four asterisk-delimited fields in the first portion 15 of the PCCF format block 2. The second portion 16 of PCCF format block 2 contains a set of asterisk-delimited fields, where there in one such field for each operational signal to be generated. Two such fields 21 and 22 are illustrated in the example of FIG. 3. The first field 21 contains values that relate to the generation of a first operational signal that is output when the power key is pressed. The second field 22 contains values that relate to the generation of a second operational signal that is output when the exit key is pressed.

Field 21 includes two semicolon-delimited subfields. The first semicolon-delimited subfield "D:1,C:0000,K:KEY_POWER" is a subfield that contains multiple comma-delimited subsubfields. The first subsubfield contains "D:1". This indicates that field 21 is for device "D1". As defined above in field 18, device D1 is "DEVICE_VCR". The second subsubfield contains "C:0000". This indicates that field 21 is for codeset number "0000". The third subsubfield is a key identification subsubfield of value "K:KEY_POWER". This subsubfield indicates that field 21 is for the function "KEY_POWER". The "KEY_POWER" function, as set forth above, defines what happens when the key "POWER" is pressed.

The second semicolon-delimited subfield includes numerous comma delimited subsubfields. A first set of the subsubfields is a "signal characteristic information" set of subsubfields. (This "set" of subsubfields is also referred to using the general term "field" in this patent document in order to simplify claim terminology. Accordingly, one field may be contained in another field. Not all fields are asterisk delimited.)

The "signal characteristic information" in the example is "9,9,RF,IR". The "9,9" denotes the carrier on time, and carrier off time, respectively. During a mark portion of an operational signal, the operational signal is not actually at a digital high for the entire duration of the mark portion, but rather is modulated on and off rapidly at what is called the "carrier" frequency. The first "9" designates the number of time units that the carrier is high during one cycle of the carrier. The second "9" designates the number of time units that the carrier is low during one cycle of the carrier. Accordingly, "9,9" designates a 50/50 duty cycle carrier having a total period of 18 time units.

The "RF" indicates that the operational signal is a "repeat frame". The term "repeat frame" means that a frame as defined by the following mark/space values is repeated multiple times. There are different types of repeat frames. One type of repeat frame is an "infinite repeat frame". The term infinite repeat means that the frame is repeated over and over as long as the key is held pressed down by the user of the remote control device. Another type of repeat frame is a repeat frame that only repeats a specified number of times. If, for example, the operational signal that corresponds to field 21 were a repeat frame that was to repeat twice, then the "RF" designating "repeat frame" would be followed by a comma-delimited "2R". The "2R" would designate that the repeat frame was to be repeated twice regardless of how long the key is pressed. If the frame is only to appear once in the operational signal, then the frame is termed a non-repeat frame. A non-repeat frame is designated with the comma-delimited value "NR". In the example of operational signal of field 21, the frame is an infinite repeat frame. This is designated by the "IR" that follows the "RF" designator.

The next comma-delimited values of the semicolon-delimited subfield are mark/space information values. The various mark/space values are comma-delimited. (These mark/space information values are referred to together using the general term "field" in this patent document in order to simply claim terminology. Accordingly, one field may be contained in another field. Not all fields are asterisk delimited.)

The first "M4000" indicates a mark of a duration of 4000 time units. The second "S4000" indicates a space of a duration of 4000 time units. When the key "POWER" is pressed, the operational signal includes a frame that has a series of mark and space times that correspond to the string of mark and space values in the mark/space information.

In the example of the operational signal to be output when the "POWER" key is pressed, all the frames of the operational signal are to be the same. In some operational signals, however, there may be one or more "last" frames that are different than preceding frames. A last frame is denoted by a separate semicolon-delimited subfield. The separate semicolon-delimited subfield starts with carrier on/off information and ends with mark/space information. The fact that the subfield describes a last frame is designated by a "LF" in the "signal characteristic information" subsubfields that define the frame. If, for example, the last frame is to be repeated twice, then the "signal characteristic information" may be "5,5,RF,2R,LF". The "5,5" designate the carrier on/off timing. The "LF" indicates that the frame is a last frame. The "RF" indicates that the frame is a repeat frame. The "2R" indicates that the last frame is to be repeated twice. Accordingly, multiple such semicolon-delimited frame descriptions can be chained together to describe an operational signal.

Although not illustrated in the figures, the signal characteristic information can include a toggle control subsubfield, and this information can reference descriptions of toggle frames. In one example, "T0,XY" and "T1,XY" are two labels that are usable to delimit toggle frames. The first time the associated key is pressed, a first frame whose description follows the first "T0,XY" label and precedes the second "T1,XY" label is transmitted. The next time the key is pressed, the frame whose description follows the second "T1,XY" label is transmitted. The descriptions of each of the two frames is in accordance with the manner of describing a frame as described above. The value "X" is an ASCII character value that indicates the number of different types of toggle frames there are. The "X" is a binary exponent such that a "X" value of one indicates two toggle frames. The first toggle frame is denoted by label "T0". The second toggle frame is denoted by label "T1". The value "Y" is a one ASCII character value that can have special predefined meanings that describe different toggle frame types. In the present ordinary case where each time the key is pressed the type of frame transmitted is alternated between two different types of frames, the "Y" bit is zero.

In the example of FIG. 1, the designer of the remote control device (the second entity) describes the new codeset in the PCCF format as the format block of FIG. 3. This format block is then communicated (for example, as an ASCII text file) to the microcontroller supplier (the first entity). The first entity then compresses and reformats the codeset information as represented by block 4 in FIG. 1. One way that this compression and reformatting can be done is set forth below.

When a key is pressed on the remote control device, the microcontroller determines what action to take. This typically involves identifying the appropriate signal characteristic information and mark/space information for the operational signal to be generated. The signal characteristic information and mark/space information is stored at a location in memory. The microcontroller uses the information in the first set of subfields to generate a pointer to the appropriate information in memory. If, for example, the remote control device were in the "VCR" mode where the remote control device is to control the "DEVICE_VCR", and codeset "0000" is to be used, and the "POWER" key was pressed, then this information would be used to point to a location in memory where the signal characteristic information and mark/space information for field 21 is stored. Accordingly, the compression and reformatting operation packs the various pairs of signal characteristic and mark/space information fields together in memory and builds a corresponding amount of pointer information that allows the microcontroller to generate an offset pointer to the appropriate place in memory depending on the key that was pressed and the mode in which the remote control device is operating.

Although the signal characteristic information values appear in PCCF format block 2 as ASCII character values so that they will be readily readable by a human, the various values of the signal characteristic information do not actually need eight bits or more to convey the needed information. For example, the subsubfield that designates whether the frame is a repeat frame or a non-repeat frame can only have one of two values. The "RF" value corresponds to one value. The "NR" value corresponds to the other value. When the PCCF format block 2 is compressed and reformatted by block 4, the value of this subsubfield is converted into a single-bit value. In a similar way, the various other subsubfields of the signal characteristic information are representable by smaller numbers of bits than the ASCII character values consume in the PCCF format block. There is a one-to-one correspondence between the various ASCII subsubfields in the PCCF format block and the smaller subsubfields in the compressed and reformatted information. The rendering engine 5 includes a parser that knows where the various smaller subsubfields are located in the compressed and reformatted information.

Block 4 also compresses and reformats the mark/space information. Rather than representing each mark space by multiple human-readable ASCII characters such as "M4000", the same information is representable by a table that contains the mark time of 4000 units, and a pointer that points to the 4000 units entry in the table. Block 4 creates a table containing one entry for each different mark and space time value, and then replaces the mark/space time values in the description of the operational signal with a string of short pointers to entries in the table where the actual mark and space times can be found. Because there is a relatively small number of entries in the table, the pointers to the table entries can have a relatively small number of bits. The rendering engine 5 knows where the table is found in memory, and uses the pointer values to obtain the actual mark and space times in order to generate the operational signal.

Although a method is described above that involves describing codesets of a codeset database in the PCCF format, and then compressing, reformatting and encrypting the information before it is communicated from the entity that compiled the codeset database (the first entity) to another entity (the second entity), the PCCF format can be used in another method to communicate PCCF format blocks in the decipherable ASCII form from the first entity to the second entity in uncompressed, unreformatted, and unencrypted form. PCCF format blocks may, for example, be communicated from one entity to another under license to protect the proprietary nature of the codeset information contained in the PCCF format blocks. The PCCF format is a codeset interchange format of general utility.

Where the remote control device is a personal computer or other device that has a relatively large amount of memory storage space available to hold the codeset database information, storing the codeset database information in the larger PCCF format blocks may be preferable to storing the information in a compressed and reformatted format that is not so readily read by a human. The personal computer can be programmed to receive the PCCF format blocks in ASCII form, to parse the PCCF format blocks to extract the various values as explained above, and to generate operational signals that are used to drive a transmitter (for example, an IR LED) coupled to the personal computer. Alternatively, a microcontroller having the rendering engine described above is provided by the first entity for incorporation onto an expansion card that is in turn incorporated into the personal computer remote control device being designed by the second entity. Software that executes on the personal computer is written to perform the necessary compression and reformatting needed to convert the PCCF format block ASCII information into a form that can be received and understood by the rendering engine in the microcontroller. PCCF format blocks in ASCII form are read out of memory in the personal computer, are compressed and reformatted, and are supplied to the microcontroller such that the microcontroller outputs operational signals. The operational signals are supplied to a transmitter (for example, an IR LED) to communicate the operational signals to an electronic consumer device to be controlled.

Although the present invention has been described in connection with certain specific embodiments for instructional purposes, the present invention is not limited thereto. A file of PCCF format blocks can include a machine-readable PCCF version number field that indicates the version of the PCCF format that is used in the file. The PCCF format field allows the PCCF format to be revised and added to over time in an upward compatible way. The file of PCCF format blocks can include human-readable text information fields at various places in the file that set forth the various fields of the PCCF format, how they can be delimited, and what kind of information each of the fields can contain. A person who has such a file can use the embedded text information fields to determine how a particular codeset can be described in a way that is consistent with the PCCF format of the file. The various fields in the PCCF format block can be delimited with any particular ASCII character or group of ASCII characters. The delimiter examples set forth above involving asterisks, semicolons, and commas are just examples. Although the codeset communication format is explained above to be public, the codeset communication format may be supplied to selected entities pursuant to an agreement that the recipient use the knowledge of the format in a particular way only. The codeset communication format may, in such an example, see limited and controlled distribution and in this sense is not public. The description of codesets in text in the PCCF format is not, however, an incidental occurrence, but rather is to be more widely practiced as a way for codeset information to be communicated between an entity that maintains a codeset database (for example, a microcontroller supplier) and other entities (for example, remote control device designers) that license use of the codeset database or parts of the codeset database. Accordingly, various modifications, adaptations, and combinations of various features of the described embodiments can be practiced without departing from the scope of the invention as set forth in the claims.

What is claimed is:

1. A method performed by a controlling device having an input element, comprising:
   responding to an activation of the input element by using, in combination, a first command generating information that is retrieved from an encrypted codeset information stored in a memory of the controlling device and decrypted by a decryptor of the controlling device and a second command generating information that is retrieved from an unencrypted codeset information that is stored in the memory of the controlling device to generate a command signal for transmission by a transmitting device of the controlling device;
   wherein the generated command signal will have both a format recognizable by a controllable device and a data indicative of a functional operation of the controllable device.

2. The method as recited in claim 1, wherein the transmitting device comprises an infrared transmitting device.

3. The method as recited in claim 1, wherein the controlling device retrieves the first command generating information from the encrypted codeset information stored in the memory for provision to the decryptor or retrieves the second command generating information from the unencrypted codeset information stored in the memory as a function of an operating mode of the controlling device.

4. The method as recited in claim 1, wherein the encrypted codeset information comprises a compressed format block having first data fields and second data fields, each of the first data fields describes, via use of one or more first characters taken from an alphabet, a respective one of plural input elements of the controlling device, and each of the second data fields describes, via use of one or more second characters taken from the alphabet, a respective one of a plurality of functions that is to be performed by the controllable device.

5. The method as recited in claim 4, wherein the compressed format block further has a third data field that describes, via use of one or more third characters selected from the alphabet, a type for the controllable device.

6. The method as recited in claim 5, wherein the compressed format block further has a fourth data field that describes, via use of one or more fourth characters selected from the alphabet, the type for the controllable device.

7. The method as recited in claim 1, wherein the input element comprises a hard key.

* * * * *